United States Patent
Nosratinia et al.

(10) Patent No.: US 9,059,751 B2
(45) Date of Patent: Jun. 16, 2015

(54) SYSTEMS AND METHODS FOR MULTIPLICATIVE SUPERPOSITION FOR MIMO BROADCAST CHANNELS

(71) Applicant: The Board of Regents, The University of Texas System, Austin, TX (US)

(72) Inventors: Aria Nosratinia, Plano, TX (US); Yang Li, Plano, TX (US)

(73) Assignee: The Board of Regents, The University of Texas System, Austin, TX (US)

( * ) Notice: Subject to any disclaimer, the term of this patent is extended or adjusted under 35 U.S.C. 154(b) by 181 days.

(21) Appl. No.: 13/924,168

(22) Filed: Jun. 21, 2013

(65) Prior Publication Data

US 2013/0343474 A1 Dec. 26, 2013

Related U.S. Application Data

(60) Provisional application No. 61/662,654, filed on Jun. 21, 2012.

(51) Int. Cl.
| | |
|---|---|
| *H04B 7/02* | (2006.01) |
| *H04B 7/04* | (2006.01) |
| *H04L 25/02* | (2006.01) |
| *H04L 27/18* | (2006.01) |
| *H04J 99/00* | (2009.01) |

(52) U.S. Cl.
CPC ............ *H04B 7/0413* (2013.01); *H04L 25/023* (2013.01); *H04L 27/18* (2013.01); *H04J 15/00* (2013.01)

(58) Field of Classification Search
CPC ..... H04B 7/0413; H04B 7/0456; H04J 15/00; H04L 25/023; H04L 27/18

USPC .......................................................... 375/267
See application file for complete search history.

(56) References Cited

U.S. PATENT DOCUMENTS

| 3,949,171 A    * | 4/1976  | Painter .......................... 370/203 |
|------------------|---------|--------------------------------------------|
| 2005/0117520 A1* | 6/2005  | Miyoshi ........................ 370/238   |
| 2007/0250638 A1* | 10/2007 | Kiran et al. ................... 709/236   |
| 2010/0232525 A1* | 9/2010  | Xia et al. ....................... 375/259  |

OTHER PUBLICATIONS

Chae et al., "Coordinated Beamforming for the Multiuser MIMO Broadcast Channel With Limited Feedforward," Dec. 2008, IEEE Transactions on Signal Processing, vol. 56, No. 12, pp. 6044-6056.*

(Continued)

*Primary Examiner* — David B. Lugo
(74) *Attorney, Agent, or Firm* — Yee & Associates, P.C.

(57) ABSTRACT

A method for using superposition in transmission of signals. The method may include receiving, at a first user equipment (UE), a product signal from a transmitter, wherein the product signal comprises a product superposition of a first baseband signal with a first encoded message and a first pilot signal configured for receipt by the first UE and a second baseband signal with a second encoded message and a second pilot signal configured for receipt by a second UE. The method may include estimating, by the first UE using the product signal, a first combined product of the second baseband signal and a first channel coefficient matrix intended for the first UE, wherein estimating is based on the first pilot symbol. The method may include decoding, by the first UE using the first combined product, the first encoded message by removing the second baseband signal from the product signal.

20 Claims, 9 Drawing Sheets

(56) References Cited

OTHER PUBLICATIONS

Li et al., "Broadcasting on the Grassmannian: Enhancing the Multiplexing Gain," 2011 IEEE International Symposium on Information Theory Proceedings, Jul.-Aug. 2011, pp. 1733-1737.

International Search Report and Written Opinion, dated Aug. 30, 2013, regarding Application No. PCT/US2013/047065, 9 pages.

Vazquez-Araujo, "Approaching the MIMO capacity with Superposition Coded Modulation," Proceedings of the 6th International Symposium on Turbo Codes & Iterative Information Processing, Sep. 2010, pp. 299-303.

* cited by examiner

SYSTEMS AND METHODS FOR MULTIPLICATIVE SUPERPOSITION FOR MIMO BROADCAST CHANNELS

This application claims priority to U.S. provisional application 61/662,654, filed Jun. 21, 2012, which is incorporated herein by reference.

TECHNICAL FIELD

The illustrative embodiments relate generally to wireless data communications, and more particularly, the illustrative embodiments relate to systems and methods for achieving suitable transmission strategies using multiplicative superposition signaling structures.

DETAILED DESCRIPTION

Figure 1:
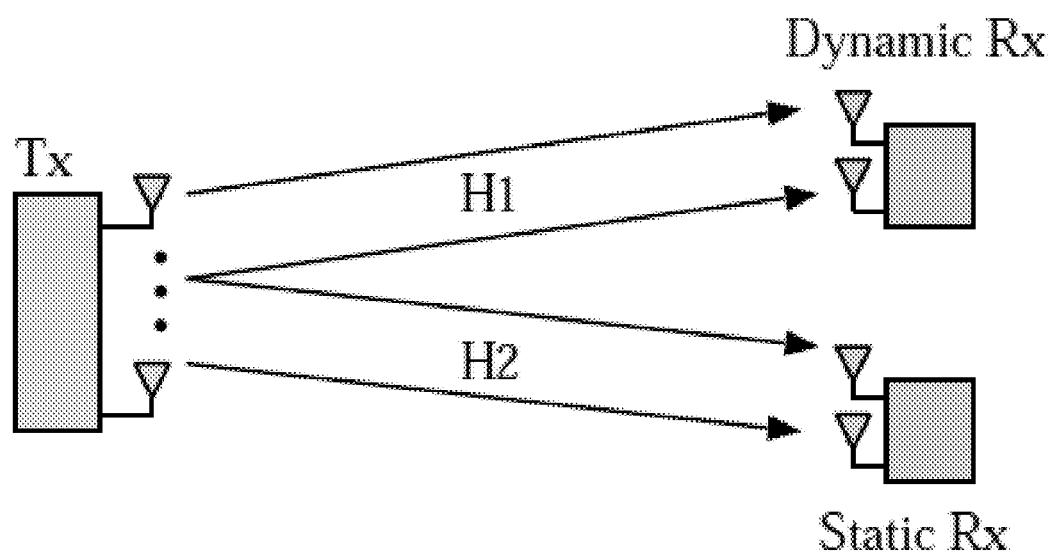
FIG. 1 is a schematic, block diagram of an example channel model according to an illustrative embodiment.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense.

I. Product Superposition for MIMO Broadcast Channels

In wireless communications, channel state information (CSI) refers to known channel properties of a communication link. For example, channel state information represents the state of a communication link from the transmit source(s) to the receiver source(s). This information describes how a signal propagates from the transmitter to the receiver and represents the combined effect of, for example, scattering, fading, and power decay with distance. The channel state information makes it possible to adapt transmissions to current channel conditions, which is crucial for achieving reliable communication with high data rates in multi-antenna systems. Channel state information at the transmitter (CSIT) is downlink CSI known at the transmitter. Channel state information at the receiver (CSIR) is downlink CSI known at the receiver.

The suitable transmission strategy for multi-user MIMO (multiple-input and multiple-output) broadcast channels often depends on the channel knowledge at the transmitter and receiver. For instance, a traditional transmission method, orthogonal transmission (TDMA), can achieve optimal degrees of freedom when channel state information known at the receiver (CSIR) but not known at the transmitter (CSIT), as well as when neither CSIT nor CSIR is known. "Degrees of freedom" is an approximation of rate at high signal-to-noise ratio (SNR), and is the first order optimization of rate/throughput.

The illustrative embodiments disclose an improved transmission strategy by providing systems and methods in which the achieved degrees of freedom may be better than that obtained using existing transmission methods, including TDMA. In particular, the illustrative embodiments provide multiplicative (or product) superposition signaling structures in which the signals of two receivers may be multiplied to produce the broadcast signal. This approach of using the product of the signals is in contrast with traditional transmission strategies that employ additive superpositioning signaling structures. Superposition based on a multiplicative structure increases the degrees of freedom for MIMO broadcast channels and allows for attaining the optimal degrees of freedom under a wide set of antenna configurations and coherence lengths. Either one or both receiver's signals may be constructed using a unitary structure.

Aspects of the illustrative embodiments are equally applicable in any channel information knowledge scenario. For instance, a multiplicative superpositioning scheme may be used when receivers and/or transmitter have full channel state information knowledge, no channel state information knowledge, some channel state knowledge, or any combination of the CSI knowledge above (e.g., when one receiver has full CSIR knowledge and another receiver has no or limited CSIR knowledge). Thus, the multiplicative superpositioning scheme disclosed in the illustrative embodiments is not limited by the channel state information known by the receivers or transmitter.

One embodiment of the disclosure comprises a signaling method referred to as Grassmannian superposition. In this embodiment, the multiplicative superposition comprises having the information for the two receivers conveyed by the row and column spaces of the transmitted signals, which are constructed from a product of two signals that lie on different Grassmannians. The signals for the two receivers do not interfere with each other even though there is no CSIT, a main point of departure from traditional superposition broadcasting. The transmit signal is a product of two Grassmannian codewords, producing higher degrees of freedom than orthogonal transmission while reception is still interference-free at each receiver.

Another embodiment of the disclosure comprises a signaling method referred to as Grassmannian-Euclidean superposition. In this embodiment, the multiplicative superposition comprises having the information for the static receiver carried by the signal matrix values (coherent signaling), while having the information for the dynamic receiver transported on the Grassmannian. The static receiver may perform interference decoding and cancellation.

It is also possible to extend the illustrative embodiments to more than two receivers. The set of receivers can be divided into two sets. At each point in time, the transmitter may use multiplicative superposition to broadcast to two receivers, one from each group. A schedule selects the pair of receivers that is serviced at each time. The time-sharing parameters defining the overall rate region may be as follows: one parameter determines how long a given pair is serviced (time sharing between pairs) and for each pair a parameter determines the operating point of the degree-of-freedom region of that pair. The time-sharing parameters can also be the fraction of the total available spectrum assigned to each users, e.g., a frequency-division-duplex (FDD) system.

Consider a particular multiplicative superpositioning example which examines broadcast channels having varying or unequal CSIR knowledge, which is motivated by downlink scenarios where receivers/users have different mobilities. In other words, this varying or unequal CSIR knowledge scenario may occur when one receiver has full CSIR knowledge and another receiver has no or limited CSIR knowledge. Low-mobility users (i.e., users in a static position or moving slowly) have the opportunity to reliably estimate their channel information (CSIR), while high-mobility users (i.e., users moving more quickly) do not have the same opportunity. The receiver with full CSIR may be referred to as the "static receiver" and the receiver with no CSIR may be referred to as the "dynamic receiver" as shown in the example channel model in FIG. 1.

In this non-limiting example, a broadcast channel has an M-antenna transmitter and two receivers. The dynamic receiver may have $N_1$ antennas and the static receiver may have $N_2$ antennas. The channel coefficient matrix from the transmitter to the dynamic and static receivers may be denoted by $H_1 \square C^{N_1 \times M}$ and $H_2 \square C^{N_2 \times M}$, respectively. It may be assumed that channel $H_1$ may be constant for intervals of T symbols, and is unknown by either receiver. In this example, the channel coefficient matrix $H_2$ may be known by the static receiver.

Over T time-slots (symbols), the transmitter may send a signal matrix $X=[x_1, \ldots, x_M]^t$ over M antennas, where $x_i \square C^{T \times 1}$ is the transmitted signal vector over the antenna i. The normalized signal at the dynamic and static receivers is respectively $$Y_1 = H_1 X + \frac{1}{\sqrt{\rho}} W_1, \quad (1)$$

$$Y_2 = H_2 X + \frac{1}{\sqrt{\rho}} W_2,$$

where $W_1 \square C^{N_1 \times T}$ and $W_2 \square C^{N_2 \times T}$ are additive noise with i.i.d entries CN(0,1). Each row of $Y_1 \square C^{N_1 \times T}$ (or $Y_2 \square C^{N_2 \times T}$) corresponds to the received signal at an antenna of the dynamic receiver (or the static receiver) over T time-slots. The transmitter may have an average power constraint $\rho$, and therefore, in the normalized channel model given by Eq. (1), the average power constraint is:

$$\mathbb{E}\left[\sum_{i=1}^{M} tr(x_i^\dagger x_i)\right] = T. \quad (2)$$

The rate achieved at high signal-to-noise ratio (SNR), i.e., degrees of freedom achieved by the two receivers, is $$d_i = \lim_{\rho \to \infty} \frac{R_i(\rho)}{\log \rho},$$

where $R_i(\rho)$ is the rate of the dynamic receiver for i=1 and the static receiver for i=2, respectively. The terms "multiplexing gain" and "degrees of freedom" may be used interchangeably in this disclosure.

Ii. Non-Interfering Superposition Broadcast Over the Grassmannian

Figure 2:
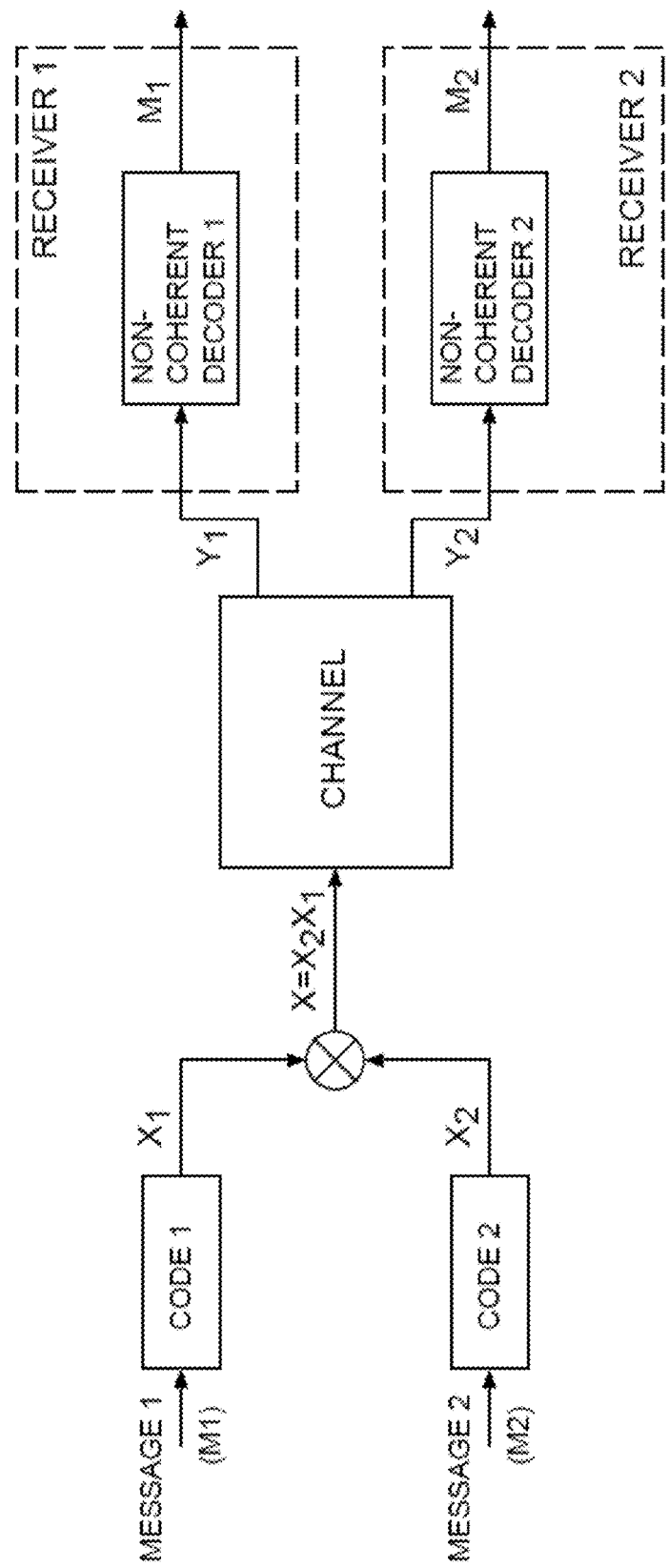
FIG. 2 is a schematic, block diagram of an exemplary non-coherent multiplicative superposition signaling system according to an illustrative embodiment.

FIG. 2 is a schematic, pictorial representation of an exemplary non-coherent multiplicative superposition signaling system according to an illustrative embodiment. The example structure in FIG. 2 provides an overview of how multiplicative superpositioning may be used to obtain the degrees of freedom absent in traditional additive superpositioning techniques in a non-coherent scheme. In particular, FIG. 2 illustrates a computationally simple doubly non-coherent scheme in which each receiver may detect non-coherently and each receiver is blind to the other's presence; thus, no "interference peeling" occurs. In this Grassmannian superposition scheme, the transmit signal is a product of two Grassmannian codewords, producing higher degrees of freedom than orthogonal transmission while reception is still interference-free at each receiver.

In this scheme, message 1 is to be sent to a first user (receiver 1), and a message 2 is to be sent to a second user (receiver 2). In the message encoding performed in step 1 at the transmitter, calculations, mappings, and modulations may be performed on each of the messages using certain codebooks, code vectors, and modulation schemes for message encoding, e.g., generating signal $X_1$ and signal $X_2$.

Specifically, for example, in step 1, a message for user 1 (message 1) is fed into Code 1. Code 1 is a codebook that may use a certain channel code to encode message 1. Examples of such channel codes include Turbo code and LDPC code. Code 1 may also use a certain modulation scheme to generate the signal $X_1$. In one example, the modulation scheme may comprise Grassmannian codewords.

Similarly, a message for user 2 (message 2) is fed into Code 2. Code 2 is a codebook that may also use a certain channel code (e.g., Turbo code or LDPC code) to encode message 2. Code 2 may also use a certain modulation scheme (e.g., Grassmannian codewords) to generate the signal $X_2$.

In step 2, the transmitter may perform product superposition by multiplying these signals $X_1$ and $X_2$ to obtain a product signal X. The transmit baseband signal X is formed by $X=X_2 X_1$, where $X_1$ and $X_2$ are generated by step 1. The transmitter may transform the transmit baseband signal X into a radio frequency signal, such as, for example, by using certain pulse shaping and multiplying a high frequency carrier. The product signal X may then be transmitted, and the outputs $(Y_1, Y_2)$ are received by the two respective receivers.

In step 3, both of the receivers may decode the signals received. As shown, receiver 1 receives high frequency signal $Y_1$. Receiver 1 may then down convert the signal into a baseband signal, and apply a certain non-coherent decoder to decode message 1. In one example, the non-coherent decoder may comprise a maximum likelihood (ML) decoder.

Likewise in step 3, receiver 2 receives high frequency signal $Y_2$ and then down converts the signal into a baseband signal. Receiver 2 may also apply a certain non-coherent decoder (e.g., maximum likelihood (ML) decoder) to decode message 1.

A. A Toy Example

Consider an example that comprises a static receiver and a dynamic receiver and in which $M=N_2=2$, $N_1=1$ and $T=2$. The traditional orthogonal transmission method may attain the degrees of freedom of ½ per time-slot for the dynamic receiver and 2 per time-slot for the static receiver. By time-sharing between the two receivers, the following degrees of freedom region are $$\left(\frac{t}{2}, 2-2t\right), \quad (3)$$

where $t \square [0,1]$ is a time-sharing factor.

In contrast, consider now the product superposition method where the transmitter sends the following signal over 2 time-slots (4)

$$X = x_2 x_1^t \epsilon C^{2\times 2}, \quad (14)$$

where $x_1 = [x_1^{(1)} \ x_2^{(1)}]^t$ and $x_2 = [x_1^{(2)} \ x_2^{(2)}]^t$ are the signals for the dynamic receiver and the static receiver, respectively. $x_1$ and $x_2$ are restricted to have unit-norm, namely from codebooks that lie on $\mathbb{G}(2,1)$.

The signal received at the dynamic receiver is $$y_1 = [h_1^{(1)} h_2^{(1)}] \begin{bmatrix} x_1^{(2)} \\ x_2^{(2)} \end{bmatrix} [x_1^{(1)} x_2^{(1)}] + \frac{1}{\sqrt{\rho}} [\omega_1^{(1)} \omega_2^{(1)}] \quad (5)$$

$$= \tilde{h}^{(1)} [x_1^{(1)} x_2^{(1)}] + \frac{1}{\sqrt{\rho}} [\omega_1^{(1)} \omega_2^{(1)}],$$

where $h_1^{(1)}$ and $h_2^{(1)}$ are channel coefficients between the dynamic receiver and two transmit antennas.

In Eq. (5), $\tilde{h}^{(1)}$ is the equivalent channel coefficient seen by the dynamic receiver.

The subspace spanned by the transmit vector $x_1^t$, in the high-SNR regime when noise is negligible, may not be affected by the equivalent channel coefficient $\tilde{h}^{(1)}$. Therefore the dynamic receiver may be able to determine the code vector specified by $x_1^t = [x_1^{(1)} \ x_2^{(1)}]$. Thus, the degrees of freedom achieved by the dynamic receiver is 1 (thus ½ per time-slot). This may be the best that the dynamic receiver can do even in the absence of another receiver; therefore, in the presence of another receiver it may be able to do no better, and thus the degrees of freedom is optimal.

Now, consider the received signal of the static receiver at one of the two time-slots, e.g., time-slot 1:

$$y_2 = H_2 \begin{bmatrix} x_1^{(2)} \\ x_2^{(2)} \end{bmatrix} x_1^{(1)} + \begin{bmatrix} w_1^{(2)} \\ w_2^{(2)} \end{bmatrix}. \quad (6)$$

Because the static receiver knows $H_2$, it may invert the channel:

$$(H_2^{-1} y_2)^t = x_1^{(1)} [x_1^{(2)} x_2^{(2)}] + [w_1^{(2)} w_2^{(2)}] H_2^{-1}, \quad (7)$$

After channel inversion, the equivalent channel seen by the static receiver is $x_1^{(1)}$, i.e., part of the dynamic receiver's signal. Thus, the static receiver may also be confronted with an unknown "channel"; therefore, the illustrative embodiments may resort to Grassmannian signaling via the subspace of $x_2$. The degrees of freedom achieved by this method is again 1, i.e., ½ per time-slot.

With product superposition, the static receiver may achieve ½ degrees of freedom "for free" in the sense that the degrees of freedom were extracted for the static receiver while the dynamic receiver was making full use of the channel without making any allowances for another receiver. These extra degrees of freedom are absent in the orthogonal transmission methods.

Time-sharing between the proposed scheme and $\square_2$, which corresponds to the exclusive transmission to the static receiver, may yield the degrees of freedom region $$\left(\frac{1}{2}t, 2-\frac{3}{2}t\right). \quad (8)$$

The above region may be strictly larger than the region achieved by the orthogonal transmission.

B. Grassmannian Superposition Signaling

Based on the aforementioned toy example, a general signaling method (the Grassmannian superposition) is disclosed with two properties: (1) the information may be carried by subspaces, and (2) the signals may be superimposed multiplicatively so that their row (or column) space is unaffected by multiplying the signal matrix of the other receiver.

An example of the general signaling can be constructed for $N_1 < N_2$. The transmitter sends $X \square C^{N_2 \times T}$ across $M = N_2$ antennas (if $M > N_2$, a precoder can be used to effectively reduce the active transmit antenna number or some transmit antenna can be deactivated) over T coherent interval:

$$X = \sqrt{\frac{T}{N_1}} X_2 \cdot X_1, \quad (9)$$

where $X_1 \square C^{N_1 \times T}$ and $X_2 \square C^{N_2 \times N_1}$ are the signals for the dynamic receiver and the static receiver, respectively. Here, $$\sqrt{\frac{T}{N_1}}$$

is a normalizing factor to satisfy the power constraint. The information for the two receivers may be sent over the Grassmannian, namely $X_1$ is from a codebook $\chi_1 \subset \mathbb{G}(T, N_1)$ and $X_2$ is from a codebook $\chi_2 \subset \mathbb{G}(N_2, N_1)$. Examples of codebook $\chi_1$ and $\chi_2$ can be isotropically distributed unitary matrices.

A sketch of the argument for the degrees of freedom achieved by the Grassmannian superposition is now provided. At high SNR the noise is negligible, so the signal at the dynamic receiver may be approximately $$Y_1 \approx \sqrt{\frac{T}{N_1}} H_1 X_2 X_1 \in C^{N_1 \times T}. \quad (10)$$

Based on $Y_1$, the row space of $X_1$ may be determined, and then $(T-N_1)N_1$ independent variables (degrees of freedom) that specify the row space may be recovered, i.e., the transmitted point $X_1$ in $\chi_1 \epsilon \mathbb{G}(T, N_1)$ is found.

For the static receiver, it may invert the channel (given $H_2$ non-singular)

$$H_2^{-1} Y_2 \approx \sqrt{\frac{T}{N_1}} X_2 X_1 \in C^{N_2 \times T}, \quad (11)$$

which has approximately the same column space as $X_2$. Therefore, from the column space of $H_2^{-1} Y_2$, the transmitted point $X_2$ in $\chi_2 \in \mathbb{G}(N_2, N_1)$ may be recovered, producing $(N_2 - N_1) N_1$ degrees of freedom.

Therefore, the proposed scheme attains a degrees of freedom pair $$D_3 = \left( N_1 \left(1 - \frac{N_1}{T}\right), \frac{N_1}{T}(N_2 - N_1) \right), \quad (12)$$

An example of the general signaling can also be constructed for $N_1 \geq N_2$. In this case, if the signaling to the dynamic receiver uses all the $N_1$ dimensions available to it, there may remain no room for communication with the static receiver under the proposed signaling scheme. The reason is that if $N_1$ dimensional signals are transmitted for the dynamic receiver, the signal at the static receiver will span the entire receive space, therefore no codeword (subspace) can be distinguished from one another.

Therefore, the illustrative embodiments may reduce the dimension used for the dynamic receiver. Given $N_2$, using $\hat{N}_1 = N_2 - 1$ dimensions for signaling to the dynamic receiver maximizes the degrees of freedom region for the Grassmannian superposition. The transmit signal is $$X = \sqrt{\frac{T}{N_1}} X_2 \cdot X_1, \quad (13)$$

where $X_1 \square C^{(N_2-1) \times T}$ and $X_2 \square C^{N_2 \times (N_2-1)}$. The corresponding degrees of freedom pair for the two receive is $$D_3 = \left( (N_2 - 1)\left(1 - \frac{N_2 - 1}{T}\right), (N_2 - 1)/T \right). \quad (14)$$

Figure 3:
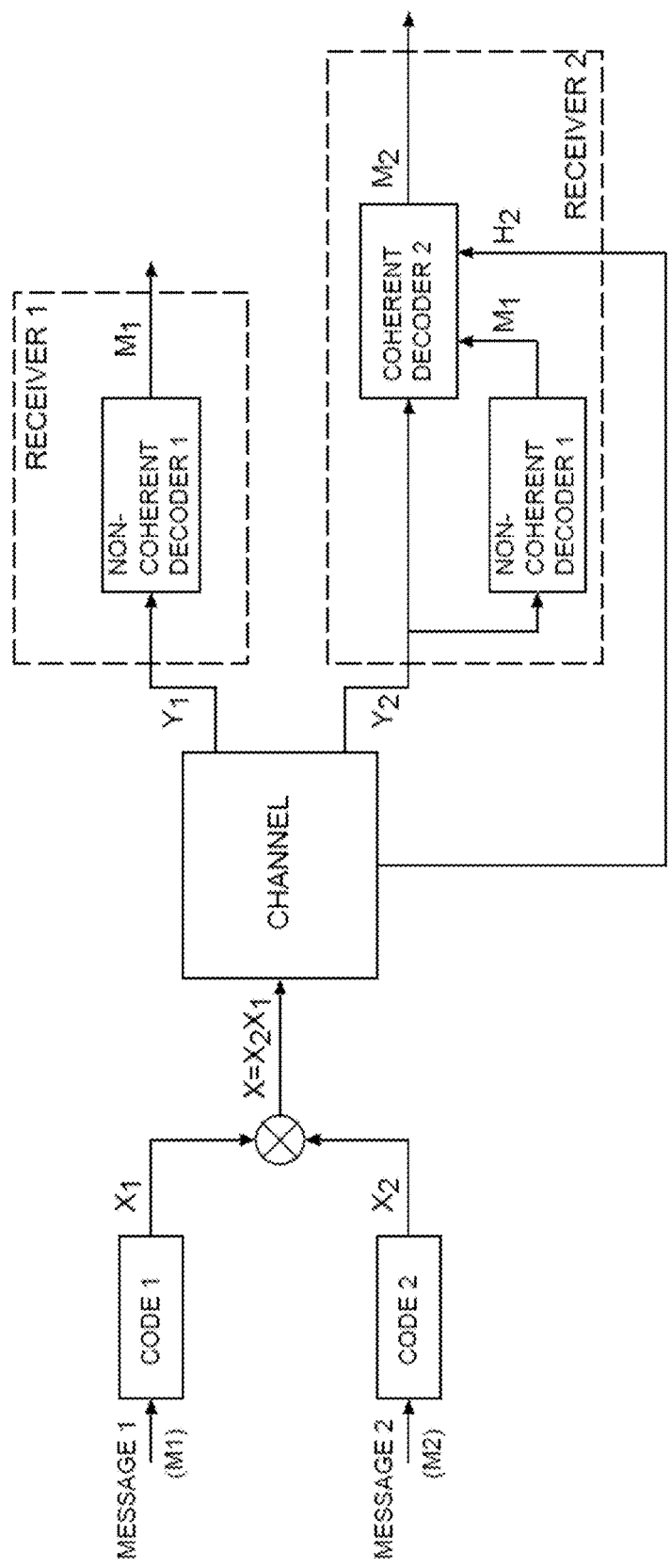
FIG. 3 is a schematic, block diagram of an exemplary coherent multiplicative superposition signaling system according to an illustrative embodiment.

III. Broadcasting Over the Grassmannian with One-Sided Interference Cancellation FIG. 3 is a schematic, pictorial representation of an exemplary coherent multiplicative superposition signaling system according to an illustrative embodiment. In particular, the example structure in FIG. 3 discloses a new transmission scheme based on successive interference cancellation, in which the static receiver decodes and removes the signal for the dynamic receiver before decoding its own signal. In situations where the receivers have varying CSI, this Grassmannian-Euclidean superposition scheme may use coherent signaling for the receiver with CSIR, and Grassmannian signaling for the receiver without CSIR, which may attain the degrees of freedom region for a broad class of channel conditions.

At the transmitter in step 1, a message for user 1 (message 1) is fed into Code 1. Code 1 is a codebook that may use a certain channel code (e.g., Turbo code or LDPC code) to encode message 1. Code 1 may also use a certain modulation scheme to generate the signal $X_1$. In one example, the modulation scheme may comprise Grassmannian codewords.

Similarly, a message for user 2 (message 2) is fed into Code 2. Code 2 is a codebook that may also use a certain channel code (e.g., Turbo code or LDPC code) to encode message 2. Code 2 may also use a certain modulation scheme (e.g., Quadrature Phase Shift Keyed, or QPSK) to generate the signal $X_2$. The particular codeword modulation scheme employed to encode a message may be dependent on the method used. For example, user 1 (message 1) in this example uses a non-coherent method and may employ a different modulation scheme (Grassmannian) than user 2 (message 2) who uses a coherent method and thus may employ a QPSK modulation scheme.

In step 2, the transmitter may perform product superposition by multiplying these signals $X_1$ and $X_2$ to obtain a product signal X. The transmit baseband signal X is formed by $X = X_2 X_1$, where $X_1$ and $X_2$ are generated by step 1. The transmitter may transform the transmit baseband signal X into a radio frequency signal, such as by using a certain pulse shaping and multiplying a high frequency carrier. The product signal X is then sent through the channel, and two outputs are generated $(Y_1, Y_2)$.

In step 3, both of the receivers may decode the signals received from the channel. As shown, receiver 1 may receive high frequency signal $Y_1$, and then down convert the signal into a baseband signal. Receiver 1 may apply a certain non-coherent decoder (e.g., ML decoder) to decode message 1.

Likewise in step 3, receiver 2 may receive high frequency signal $Y_2$ and down convert the signal into a baseband signal. Receiver 2 may also apply a certain non-coherent decoder (e.g., an ML decoder) to decode message 1. Receiver 2 may further remove the effect of message 1, e.g., by multiplying an inverse of $X_1$ from right. Receiver 2 may then invert the channel based on its channel estimate of $H_2$. Finally, receiver 2 may apply a certain coherent decoder to decode message 2. In one example, the coherent decoder may comprise a minimum mean square error (MMSE) decoder.

A. A Toy Example

Consider an example of this scheme that comprises a static receiver and a dynamic receiver and in which $M = N_1 = N_2 = 1$ and $T = 2$. Intuitively, the static receiver is able to decode the static receiver's signal, because the static receiver has CSIR but the dynamic receiver does not, and both of the receivers have the same number of antennas.

The illustrative embodiments disclose that over 2 timeslots, the transmitter may send $$X = x_2 x_1^{\dagger} \in C^{1 \times 2}, \quad (15)$$

where $x_1 = [x_1^{(1)} x_1^{(1)}]^t$ is the signal for the dynamic receiver and $x_2$ is the signal for the static receiver. Here, $x_1$ has unit-norm $(x_1^t x_1 = 1)$, and is from a codebook $\chi_1$ that is a subset of $\mathbb{G}(2,1)$, and $x_2$ can be any random complex number that satisfies the average power constraint.

The signal at the dynamic receiver is $$y_1 = h_1 x_2 [x_1^{(1)} x_2^{(1)}] + \frac{1}{\sqrt{\rho}} [w_1^{(1)} w_2^{(1)}] \quad (16)$$

$$= \tilde{h}_1 [x_1^{(1)} x_2^{(1)}] + \frac{1}{\sqrt{\rho}} [w_1^{(1)} w_2^{(1)}], \quad (17)$$

where $h_1$ is the channel coefficient of the dynamic receiver, and $\tilde{h} \triangleq h_1 x_2$ is the equivalent channel coefficient obtained by absorbing the signal of the other receiver into the channel coefficient. The dynamic receiver can determine the row space spanned by $x_1$ even though $\tilde{h}_1$ is unknown (but non-zero), in a manner similar to the toy example in the Non-Interfering Superposition Broadcast Over the Grassmannian section. The total degrees of freedom conveyed by $x_1$ is 1 (thus ½ per time-slot); this is the maximum degrees of freedom for any strategy under the same number of antennas and coherence time, therefore it is optimal.

For the static receiver, the received signal is:

$$y_2 = h_2 x_2 [x_1^{(1)} x_2^{(1)}] + \frac{1}{\sqrt{\rho}} [w_1^{(2)} w_2^{(2)}] \quad (18)$$

$$= \tilde{h}_2 [x_1^{(1)} x_2^{(1)}] + \frac{1}{\sqrt{\rho}} [w_1^{(2)} w_2^{(2)}], \quad (19)$$

where $h_2$ is the channel coefficient of the static receiver, and $\tilde{h}_2 \triangleq h_1 x_2$. Because Eqs. (17) and (19) are equivalent, if the dynamic receiver decodes the subspace of $x_1$, so does the static receiver, thus the exact signal $x_1$ is known to the static receiver (recall that each subspace is uniquely represented by a signal matrix). Then, the static receiver removes the interference signal $x_1$ $$y_2 \cdot x_1^\dagger = h_2 x_2 + \frac{1}{\sqrt{\rho}} \tilde{w}_2, \quad (20)$$

where $\tilde{w}_2$ is the equivalent noise. Since the static receiver knows $h_2$, it may decode $x_2$ and attain the degrees of freedom 1 (thus ½ per time-slot).

Therefore, the proposed scheme may attain the maximum ½ degrees of freedom for the dynamic receiver, which is the maximum degrees of freedom available to it even if the static receiver were absent. Meanwhile ½ degrees of freedom may be achieved for the static receiver without penalty to the dynamic receiver. With time sharing between this scheme and □₂, the degrees of freedom may be $$(d_1, d_2) = \left(1 - \frac{t}{2}, \frac{t}{2}\right), \quad (21)$$

where t□[0,1] is a time-sharing factor.

B. Grassmannian-Euclidean Superposition Signaling

The toy example immediately above superimposed two signals, one carrying information in its subspace, and the other in its values. This may be denoted as Grassmannian-Euclidean superposition, whose generalization is the subject of this subsection. A key feature of this method is that the static receiver may decode and remove the dynamic signal. The signaling is illustrated for two separate cases of receivers having varying CSI, based on whether the number of static receiver antennas is less than, or not less than, the number of dynamic receiver antennas.

1) $N_1 \leq N_2$: The transmitter sends $X \square C^{N_2 \times T}$, where $M = N_2$ (if $M > N_2$, a precoder can be used to effectively reduce the active transmit antenna number or some transmit antenna can be deactivated) over the coherence interval T:

$$X = \sqrt{\frac{T}{N_1 N_2}} X_2 \cdot X_1, \quad (22)$$

where $X_1 \square C^{N_1 \times T}$ and $X_2 \square C^{N_2 \times N_1}$ are signals for the dynamic receiver and the static receiver, respectively. The signal $X_1$ is from a Grassmannian codebook $\chi_1 \subset \mathbb{G}(T, N_1)$, while $X_2$ is from a conventional Gaussian codebook $\chi_2$, which is unlike the Grassmannian superposition in the Non-Interfering Superposition Broadcast Over the Grassmannian section. In the above equation $\sqrt{T}/\sqrt{N_1 N_2}$ is a power normalizing factor.

A sketch of the argument deriving the degrees of freedom attained by the superposition signaling in Eq. (22) is now presented. For the dynamic receiver, at high SNR, $Y_1 \approx H_1 X_2 X_1$. When $N_1 \leq N_2$, the equivalent channel $H_1 X_2$ is an $N_1 \times N_1$ square matrix with full rank, which does not change the row space of $X_1$. Recovering the row space of $X_1$ produces $(T-N_1)N_1$ degrees of freedom, which is similar to the Non-Interfering Superposition Broadcast Over the Grassmannian section above.

For the static receiver, the signal at high SNR is $$Y_2 \approx H_2 X_2 X_1 = \tilde{H}_2 X_1, \quad (23)$$

For $N_1 \leq N_2$, $\tilde{H}_2 = H_1 X_2$ is a tall matrix that has full column rank (with probability 1), and does not change the row space of $X_1$, which means the signal intended for the dynamic receiver can be decoded by the static receiver. After recovering the subspace spanned by $X_1$, the codeword itself is known as it is the unique representation for this subspace in the codebook $\chi_1$. Then, $X_1$ may be peeled off from the static signal:

$$Y_2 \cdot X_1^\dagger \approx \sqrt{\frac{T}{N_1}} H_2 X_2 \in C^{N_3 \times N_1}, \quad (24)$$

Because $H_2$ is known by the static receiver, Eq. (24) represents an ordinary point-to-point MIMO channel, and therefore $N_2 N_1$ degrees of freedom can be communicated via $X_2$ to the static receiver (over T time-slots).

Altogether, the Grassmannian-Euclidean superposition may attain the degrees of freedom pair □₄

$$D_4 = (N_1(1-N_1/T), N_2 N_1/T), \quad (25)$$

2) $N_1 > N_2$: Here, the signaling structure given by Eq. (22) is not directly applied. Intuitively, when the static receiver has fewer antennas than the dynamic receiver, it may not be able to decode the dynamic signal. Therefore only $N_2$ antennas are activated at the transmitter and only $N_2$ dimensions are used for the dynamic receiver. The corresponding signaling is $$X = \sqrt{\frac{T}{N_2^2}} X_2 \cdot X_1 \in C^{N_2 \times T}, \quad (26)$$

where $X_1 \square C^{N_2 \times T}$ and $X_2 \square C^{N_2 \times N_2}$, and $$\sqrt{\frac{T}{N_2^2}}$$

is a normalizing factor.

Following the same argument as the case of $N_1 \leq N_2$, the Grassmannian-Euclidean superposition achieves a degrees of freedom pair $$\mathcal{D}_4 = \left( N_2\left(1 - \frac{N_2}{T}\right), \frac{N_2^2}{T} \right). \quad (27)$$

C. Design of $\chi_1$ and $\chi_2$

Examples of codebook $\chi_1$ and $\chi_2$ may be: $\chi_1$ to be isotropically distributed unitary matrices and $\chi_2$ to be i.i.d. complex Gaussian codebook.

Recall that the essence of the Grassmannian-Euclidean superposition is to allow the static receiver to decode the signal for the dynamic receiver and then remove this interference. After interference cancellation, the static receiver has an equivalent point-to-point MIMO channel with perfect CSIR, in which case Gaussian signal achieves capacity.

IV. Training-Based Product Superposition for MIMO Broadcast Channels

In addition to the embodiments described above, additional multiplicative superposition signaling schemes are disclosed herein. Training-based product superpositioning employs training pilots to estimate channels so that signals at the receivers can be decoded coherently.

As in the embodiments disclosed earlier, particular example scenarios in which the receivers comprise a static receiver and a dynamic receiver are described below. However, it should be noted that the training-based multiplicative superpositioning schemes described herein may be applicable to any channel state information scenario, including scenarios in which any or all of the receivers and transmitter have full channel state knowledge, no channel state knowledge, some channel state knowledge, or any combination of the above.

For instance, in one non-limiting example scenario, a broadcast channel with an M-antenna transmitter and two receivers is provided. In this example, one of the receivers has access to channel state information (the "static receiver"), and the other receiver has no channel state information (the "dynamic receiver"), as shown in FIG. 1. The dynamic receiver has $N_1$ antennas and the static receiver has $N_2$ antennas. Denote the channel coefficient matrix from the transmitter to the dynamic and static receivers by $H_2 \square C^{N_1 \times M}$ and $H_2 \square C^{N_2 \times M}$, respectively. It may be assumed that $H_1$ is constant for intervals of T symbols, and is unknown by either receiver. The channel coefficient matrix $H_2$ is known by the static receiver but unknown by the dynamic receiver.

Over T time-slots (symbols), the transmitter sends a signal matrix $X = [x_1, \ldots, x_M]^t$ over M antennas, where $x_i \square C^{T \times 1}$ is the transmitted signal vector over the antenna i. The normalized signal at the dynamic and static receivers is respectively $$Y_1 = H_1 X + \frac{1}{\sqrt{\rho}} W_1, \quad (28)$$

$$Y_2 = H_2 X + \frac{1}{\sqrt{\rho}} W_2,$$

where $W_1 \square C^{N_1 \times T}$ and $W_2 \square C^{N_2 \times T}$ are additive noise with i.i.d. entries CN(0,1). Each row of $Y_1 \square C^{N_1 \times T}$ (or $Y_2 \square C^{N_2 \times T}$) corresponds to the received signal at an antenna of the dynamic receiver (or the static receiver) over T time-slots. The transmitter may be assumed to have an average power constraint $\rho$, and therefore, in the normalized channel model given by Eq. (28), the average power constraint is:

$$\mathbb{E}\left[ \sum_{i=1}^{M} tr(x_i^\dagger x_i) \right] = T. \quad (29)$$

It may be assumed $H_1$ has i.i.d. entries with zero mean and unit variance but do not assign any specific distribution for $H_1$. This general model includes Rayleigh fading as a special case, where the entries of $H_1$ are i.i.d. CN(0,1). For $H_2$ the channel is assumed to have full column (or row) rank; this assumption holds with probability 1 if $H_2$ has i.i.d. and continuous valued entries. The transmitter has no channel state information.

In examining the rate achieved at high signal-to-noise ratio (SNR), i.e., degrees of freedom achieved by the two receivers $$d_i = \lim_{\rho \to \infty} \frac{R_i(\rho)}{\log \rho},$$

where $R_i(\rho)$ is the rate of the dynamic receiver for i=1 and the static receiver for i=2, respectively. The terms multiplexing gain and degrees of freedom are used interchangeably.

V. Training-Based Oblivious Product Superposition Signaling

Figure 4:
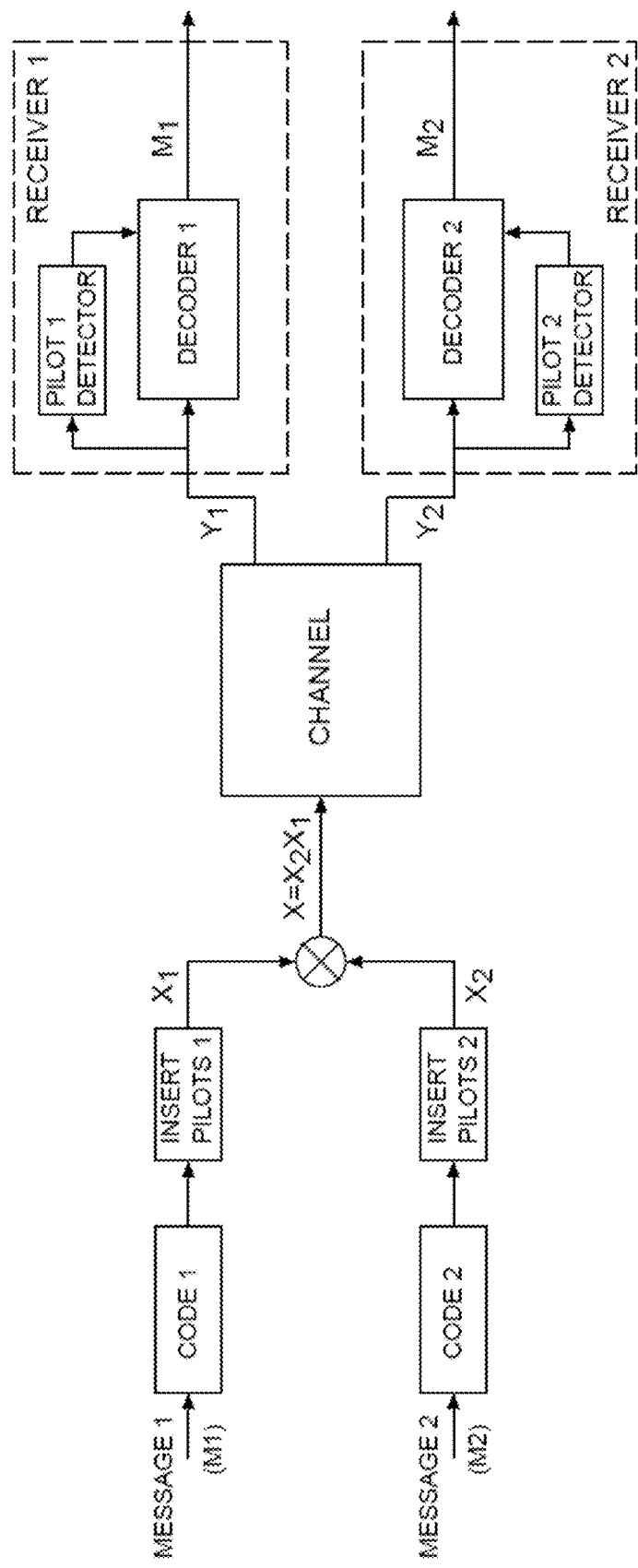
FIG. 4 is a schematic, block diagram of an exemplary training-based multiplicative superposition signaling system comprising a two-pilot blind receiver according to an illustrative embodiment.

FIG. 4 is a schematic, pictorial representation of an exemplary multiplicative superposition signaling system comprising two training pilots according to an illustrative embodiment. In this section, FIG. 4 provides another example multiplicative superposition structure that is called "oblivious" because the two receivers are not required to know (or use) the information of the training signal for the other receiver, and thus each receiver can decode its information while being oblivious of the other receiver.

In this embodiment, in the message encoding of step 1, a message for user 1 (message 1) is fed into Code 1, which may use a certain channel code (e.g., Turbo code or LDPC code) to encode message 1 and may also use a certain modulation scheme (e.g., QPSK) to generate the signal $X_1$. In addition, certain known symbols (pilot) are inserted into the coded message to generate baseband signal $X_1$.

Similarly, a message for user 2 (message 2) is fed into Code 2, which may also use a certain channel code (e.g., Turbo code or LDPC code) to encode message 2 and may also use a certain modulation scheme (e.g., QPSK) to generate the signal $X_2$. In addition, certain known symbols (pilot) are also inserted into the coded message to generate baseband signal $X_2$.

In step 2, the transmitter may perform product superposition by multiplying signals $X_1$ and $X_2$ to obtain a product signal X. The transmit baseband signal X is formed by $X = X_2 X_1$, where $X_1$ and $X_2$ are generated by step 1. The transmitter may transform the transmit baseband signal X into a radio frequency signal (e.g., by using a certain pulse shaping and multiplying a high frequency carrier), and the product signal X is then sent through the channel.

In step 3, each of the receivers may decode the signals received from the channel. As shown, receiver 1 receives high frequency signal $Y_1$ and down converts the signal into a baseband signal. Receiver 1 may then estimate the combined product of $H_1 X_2$ (composite channel) based on the known symbols (pilots) inserted in $X_1$. Based on the estimated channel, receiver 1 may then apply a certain coherent decoder (e.g., the MMSE decoder) to decode message 1.

Likewise in step 3, receiver 2 receives high frequency signal $Y_2$ and inverts the channel based on its channel estimate of $H_2$. Receiver 2 may also remove the effect of $X_1$ (e.g., using the pilots in $X_2$ to estimate a sub-matrix of $X_1$), and then invert this sub-matrix. Lastly, the receiver 2 may apply a certain coherent decoder (e.g., the MMSE decoder) to decode message 2.

A. A Toy Example

Consider an example that comprises a static receiver and a dynamic receiver and in which $M=N_2=2$, $N_1=1$ and $T=2$. The orthogonal transmission method attains the degrees of freedom of ½ per time-slot for the dynamic receiver and 2 per time-slot for the static receiver. By time-sharing between the two receivers, the following degrees of freedom region are $$\left(\frac{t}{2}, 2-2t\right), \quad (30)$$

where $t \in [0,1]$ is a time-sharing factor.

In contrast, now consider the product superposition method where the transmitter sends the following signal over 2 time-slots $$X = x_2 x_1^t \in C^{2 \times 2}, \quad (31)$$

where $x_1 = [1\ x_1]^t$ and $x_2 = [1\ x_2]^t$ are the signals for the dynamic receiver and the static receiver, respectively.

The signal received at the dynamic receiver is $$y_1 = [h_1^{(1)}\ h_2^{(1)}] \begin{bmatrix} 1 \\ x_2 \end{bmatrix} [1\ x_1] + \frac{1}{\sqrt{\rho}}[w_1^{(1)}\ w_2^{(1)}] \quad (32)$$
$$= \tilde{h}^{(1)}[1\ x_1] + \frac{1}{\sqrt{\rho}}[w_1^{(1)}\ w_2^{(1)}],$$

where $h_1^{(1)}$ and $h_2^{(1)}$ are channel coefficients between the dynamic receiver and two transmit antennas. In Eq. (32), $\tilde{h}^{(1)}$ is the equivalent channel coefficient seen by the dynamic receiver. The dynamic receiver may estimate the equivalent channel based on the signal received at the first time-slot and use the estimated channel to decode the signal $x_1$ at the second time-slot. Therefore the degrees of freedom achieved by the dynamic receiver is 1 (thus ½ per time-slot). This is the best that the dynamic receiver can do even in the absence of another receiver; therefore in the presence of another receiver it can do no better, and thus the degrees of freedom is optimal.

Now, consider the received signal of the static receiver at one of the two time-slots. Suppose that the static receiver does not know whether time-slot 1 or 2 is used to transmit $x_1$. In time-slot 1:

$$y_2 = H_2 \begin{bmatrix} 1 \\ x_1 \end{bmatrix} x_1 + \begin{bmatrix} w_1^{(2)} \\ w_2^{(2)} \end{bmatrix}. \quad (33)$$

Because the static receiver knows $H_2$, it can invert the channel as long as $H_2$ is non-singular (the noise enhancement induced by channel inversion will not affect the degrees of freedom of the static receiver):

$$(H_2^{-1} y_2)^t = x_1[1 x_2] + [w_1^{(2)} w_2^{(2)}] H_2^{-t}, \quad (34)$$

After channel inversion, the equivalent channel seen by the static receiver is $x_1$, i.e., part of the dynamic receiver's signal. Thus, the static receiver decodes $x_1$, the equivalent channel, and then decodes $x_2$. The degrees of freedom achieved by this embodiment is again 1, i.e. ½ per time-slot.

In one embodiment, the static receiver may achieve ½ degrees of freedom "for free" in the sense that the degrees of freedom was extracted for the static receiver while the dynamic receiver was making full use of the channel without making any allowances for another receiver. This extra degrees of freedom is absent in the orthogonal transmission method.

Time-sharing between the proposed scheme and $\square_2$, which corresponds to the exclusive transmission to the static receiver, yields the degrees of freedom region $$\left(\frac{1}{2}t, 2-\frac{3}{2}t\right). \quad (35)$$

B. Superposition Signaling

This proposed scheme may be generalized as follows.

1) $N_1 < N_2$: The transmitter sends $X \in C^{N_2 \times T}$ across $M=N_2$ antennas over T coherent interval:

$$X = \sqrt{\frac{T}{N_1}} X_2 \cdot X_1, \quad (36)$$

where $X_1 \in C^{N_1 \times T}$ and $X_2 \in C^{N_2 \times N_1}$ are the signals for the dynamic receiver and the static receiver, respectively. Here, $$\sqrt{\frac{T}{N_1}}$$

is a normalizing factor to satisfy the power constraint (29).

The signal matrix $X_1$ may contain $N_1$ columns whose position (indices) and entries are pre-defined and known by the dynamic receiver as a priori knowledge. Without loss of generality, it may be assumed that the first $N_1$ columns are known by the dynamic receiver (but not necessarily known by the static receiver), and denote the sub-matrix as $X_1^1 \in C^{N_1 \times N_1}$. The remaining $T-N_1$ columns contain information symbols for the dynamic receiver, which is denoted by $X_1^2 \in C^{N_1 \times (T-N_1)}$. That is $$X_1 = [X_1^1 X_1^2], \quad (37)$$

The signal matrix $X_2$ may have the following structure: it may contain $N_1$ rows whose position (indices) and entries are pre-defined and known by the static receiver as a priori knowledge. Without loss of generality, it may be assumed the first $N_1$ rows are known by the static receiver (but not necessarily known by the dynamic receiver), and denote the sub-matrix as $X_2^1$. The remaining $N_2-N_1$ rows, denoted by $X_1^2 \in C^{N_1 \times (T-N_1)}$, contains information symbols for the static receiver, which is denoted by $X_2^2$. That is $$X_2 = \begin{bmatrix} X_2^1 \\ X_2^2 \end{bmatrix}. \quad (38)$$

Here, a sketch of the argument is provided for the degrees of freedom achieved by the disclosed embodiment. At high SNR the noise is negligible, so the signal at the dynamic receiver is approximately $$Y_1 \approx \sqrt{\frac{T}{N_1}} H_1 X_2 [X_1^1 \ X_1^2] \in C^{N_1 \times T}. \quad (39)$$

Because the dynamic receiver knows $X_1^1$, it may estimate the product $H_1 X_2$ based on the observations of $Y_1$. For example, one way to estimate $H_1 X_2$ is to use the first $N_1$ columns of $Y_1$, denoted by $Y_1^1$, and to obtain $$H_1 X_2 \approx \sqrt{\frac{N_1}{T}} Y_1^1 X_1^{-1}. \quad (40)$$

Then, the dynamic receiver may decode the information matrix $X_1^2$ based on the estimate of $H_1 X_2$, which yields $N_1 \times (T-N_1)$ degrees of freedom.

For the static receiver, since $H_2$ is known by the receiver, it inverts the channel (given $H_2$ non-singular)

$$H_2^{-1} Y_2 \approx \sqrt{\frac{T}{N_1}} \begin{bmatrix} X_2^1 \\ X_2^2 \end{bmatrix} X_1 \in C^{N_2 \times T}, \quad (41)$$

Because the static receiver knows $X_2^1$, it can estimate (decode) any combinations of columns of $X_1$, and then based on this information it can decode its information matrix $X_2^2$. For example, the static receiver uses the first $N_1$ received signal vectors, $Y_2^1$, from which it decodes the first $N_1$ columns of $X_1$, that is $X_1^1$ (recall that the static receiver in this case does not necessarily know $X_1^1$)

$$X_1^1 \approx \sqrt{\frac{N_1}{T}} (X_2^1)^{-1} H_2^{-1} Y_2^1. \quad (42)$$

After knowing $X_1^1$ the static receiver can decode $X_2^2$ because the following matrix can be identified by the static receiver:

$$\begin{bmatrix} X_2^1 \\ X_2^2 \end{bmatrix} \approx \sqrt{\frac{N_1}{T}} H_2^{-1} Y_2^1 (X_1^1)^{-1}. \quad (43)$$

Then, the static receiver may decode the signal matrix $X_2^2$ and obtains $N_1 \times (N_2 - N_1)$ degrees of freedom.

Therefore, the proposed scheme may attain a degrees of freedom pair $$\mathcal{D}_3 = \left( N_1 \left( 1 - \frac{N_1}{T} \right), \frac{N_1}{T} (N_2 - N_1) \right). \quad (44)$$

In the above signaling method, one can see that the known sub-matrices $X_1^1$ and $X_2^1$ serve as training (pilot) signals. The proposed embodiment is referred to as "oblivious" as the two receivers are not required to know (or use) the information of the training signal for the other receiver.

2) $N_1 \geq N_2$: In this case, the dimension used for the dynamic receiver is reduced. Given $N_2$, using $\hat{N}_1 = N_2 - 1$ dimensions for signaling to the dynamic receiver maximizes the degrees of freedom region for the superposition. The transmit signal is $$X = \sqrt{\frac{T}{N_1}} X_2 \cdot X_1, \quad (45)$$

where $X_1 \square C^{(N_2-1) \times T}$ and $X_2 \square C^{N_2 \times (N_2-1)}$. The corresponding degrees of freedom pair for the two receivers is $$\mathcal{D}_3 = \left( (N_2 - 1) \left( 1 - \frac{N_2 - 1}{T} \right), (N_2 - 1)/T \right). \quad (46)$$

VI. Training-Based Product Superposition Signaling

Figure 5:
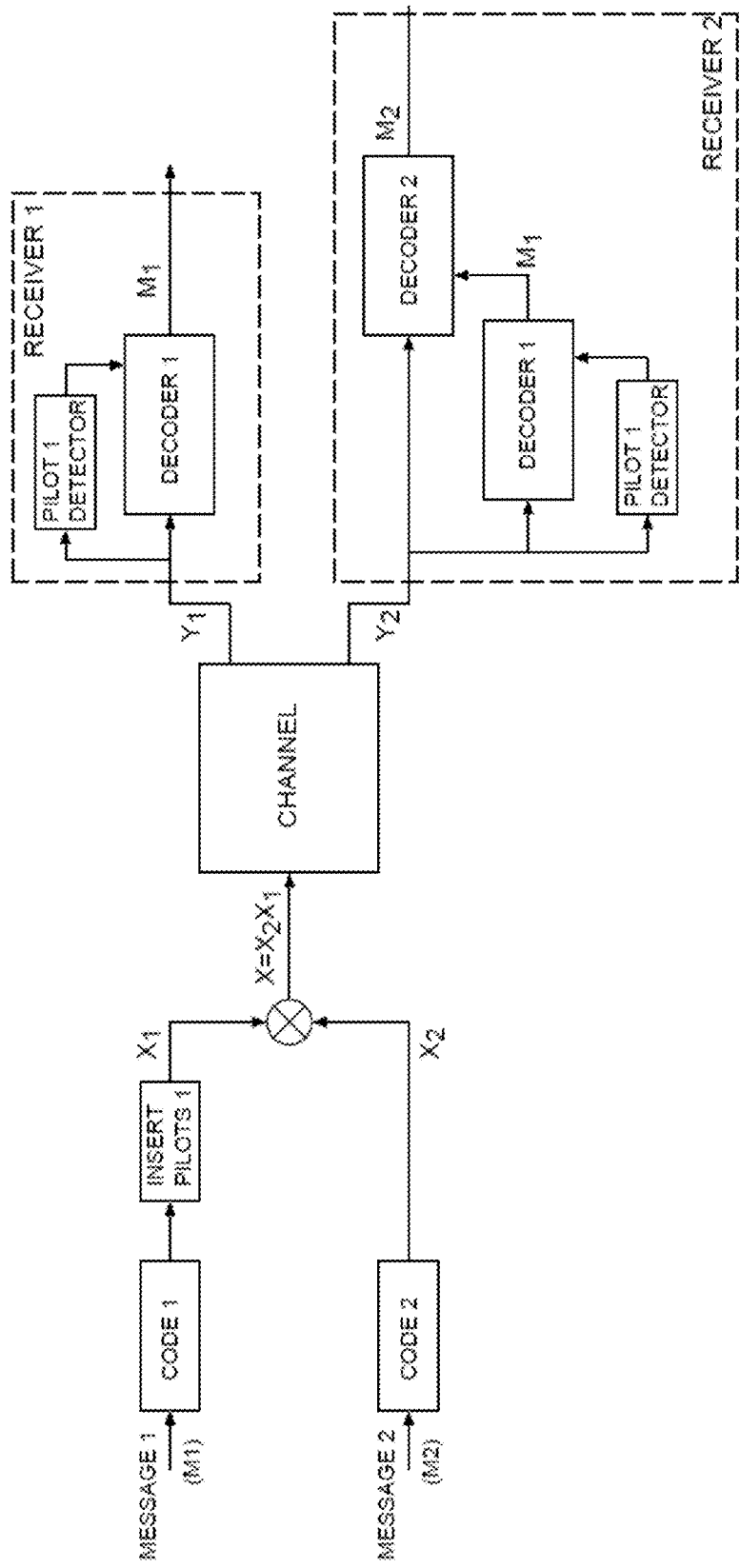
FIG. 5 is a schematic, block diagram of an exemplary training-based coherent multiplicative superposition signaling system according to an illustrative embodiment.

FIG. 5 is a schematic, pictorial representation of an exemplary coherent multiplicative superposition signaling system with training pilots according to an illustrative embodiment. This particular multiplicative superposition scheme is similar to the one shown in FIG. 3; however, this scheme comprises internal training pilots for channel estimation, which is used in coherent decoding.

At the transmitter in step 1, a message for user 1 (message 1) is fed into Code 1. Code 1 may use a certain channel code (e.g., Turbo code or LDPC code) to encode message 1. Code 1 may also use a certain modulation scheme (e.g., QPSK) to generate the signal $X_1$. Next, certain known symbols (e.g., pilot) may be inserted into the coded message to generate the baseband signal $X_1$. In addition, the message for user 2 (message 2) is fed into Code 2. Code 2 may also use a certain channel code (e.g., Turbo code or LDPC code) to encode message 2, and use a certain modulation scheme (e.g., QPSK) to generate the signal $X_2$.

In step 2, the transmitter may perform product superposition by multiplying these signals $X_1$ and $X_2$ to obtain a product signal X. The transmit baseband signal X is formed by $X = X_2 X_1$, where $X_1$ and $X_2$ are generated by step 1. The transmitter may transform the transmit baseband signal X into a radio frequency signal (e.g., by using a certain pulse shaping and multiplying a high frequency carrier), and the product signal X is then sent through the channel.

In step 3, each of the receivers may decode the signals received from the channel. Receiver 1 receives high frequency signal $Y_1$ and then down converts the signal into a baseband signal. Receiver 1 may then estimate the combined product of $H_1 X_2$ (composite channel) based on the known symbols (pilots) inserted in $X_1$. Based on the estimated channel, receiver 1 may then apply a certain coherent decoder (e.g., the MMSE decoder) to decode message 1. Likewise in step 3, receiver 2 receives high frequency signal $Y_2$ and down converts the signal into a baseband signal. Receiver 2 may then estimate a sub-matrix of the combined product of $H_1 X_2$ (composite channel) based on the known symbols (pilots) inserted in $X_1$. Receiver 2 may then apply a certain coherent decoder (e.g., MMSE decoder) to decode message 1, and then remove the effect of message 1, such as by multiplying an inverse of $X_1$ from right. Next, receiver 2 may invert the channel based on its channel estimate of $H_2$. Lastly, receiver 2 may apply a certain coherent decoder (e.g., MMSE decoder) to decode message 2.

A. A Toy Example

Consider a non-limiting scenario of this scheme which comprises a static receiver and a dynamic receiver and in which $M = N_1 = N_2 = 1$ and $T = 2$. Intuitively, the static receiver is able to decode the static receiver's signal, because the static receiver has CSIR but the dynamic receiver does not, and both of the receivers have the same number of antennas.

This approach shows that over 2 time-slots, the transmitter may send $$X = x_2 x_1' \in C^{1/2}, \quad (47)$$

where $x_1 = [1 \ x_1]'$ is the signal for the dynamic receiver and $x_2$ is the signal for the static receiver.

The signal at the dynamic receiver is $$y_1 = h_1 x_2 [1 \ x_1] + \frac{1}{\sqrt{\rho}} [w_1^{(1)} \ w_2^{(1)}] \quad (48)$$

$$= \tilde{h}_1 [1 \ x_1] + \frac{1}{\sqrt{\rho}} [w_1^{(1)} \ w_2^{(1)}], \quad (49)$$

where $h_1$ is the channel coefficient of the dynamic receiver, and $\tilde{h}_1 \triangleq h_1 x_2$ is the equivalent channel coefficient obtained by absorbing the signal of the other receiver into the channel coefficient. In the first time-slot, the dynamic receiver may estimate the equivalent channel and based on the estimation decodes the information symbol $x_1$. The total degrees of freedom conveyed by $x_1$ is 1 (thus ½ per time-slot); this is the maximum degrees of freedom for any strategy under the same number of antennas and coherence time; therefore it is optimal.

For the static receiver, the received signal is:

$$y_2 = h_2 x_2 [1 \ x_1] + \frac{1}{\sqrt{\rho}} [w_1^{(2)} \ w_2^{(2)}], \quad (50)$$

The static receiver knows that the signal vector for the dynamic receiver is in the form of $(1 \ x_1)$, so it takes the signal received at the first time-slot, which is given by $$h_2 x_2 + \frac{1}{\sqrt{\rho}} w_1^{(2)}. \quad (51)$$

Since the static receiver knows $h_2$, it decodes $x_2$ and attains the degrees of freedom 1 (thus ½ per time-slot).

Therefore, this proposed scheme attains the maximum ½ degrees of freedom for the dynamic receiver, which is the maximum degrees of freedom available to it even if the static receiver were absent. Meanwhile ½ degrees of freedom may be achieved for the static receiver without penalty to the dynamic receiver. With time sharing between this scheme and $\square_2$, the degrees of freedom attained may be $$(d_1, d_2) = \left(1 - \frac{t}{2}, \frac{t}{2}\right), \quad (52)$$

where $t \in [0,1]$ is a time-sharing factor.

B. Superposition Signaling

The above signaling scheme is now generalized as follows.

1) $N_1 \geq N_2$: The transmitter sends $X \in C^{N_2 \times T}$, where $M = N_2$, over the coherence interval T:

$$X = \sqrt{\frac{T}{N_1 N_2}} X_2 \cdot X_1. \quad (53)$$

where $X_1 \in C^{N_1 \times T}$ and $X_2 \in C^{N_2 \times N_1}$ are signals for the dynamic receiver and the static receiver, respectively. The signal $X_2$ is from a conventional Gaussian codebook $\chi_2$. In the above equation $\sqrt{T}/\sqrt{N_1 N_2}$ is a power normalizing factor, which is different from Eq. (36) since $X_2$ is not necessarily unitary.

The signal matrix $X_1$ has the same structure of the previous method, i.e., it contains $N_1$ columns whose position (indices) and entries are pre-defined and known by the dynamic receiver as a priori knowledge. Without loss of generality, it may be assumed that the first $N_1$ columns are known by the dynamic receiver (but not necessarily known by the static receiver), and denoted that the sub-matrix as $X_1^1 \in C^{N_1 \times N_1}$. The remaining $T - N_1$ columns contain information symbols for the dynamic receiver, which is denoted by $X_1^2 \in C^{N_1 \times (T-N_1)}$. That is $$X_1 = [X_1^1 X_1^2], \quad (54)$$

The signal matrix $X_2$ does not necessarily contain any known sub-matrix and all the entries may carry information.

A sketch of the argument deriving the degrees of freedom attained by the superposition signaling Eq. (53) is now provided. For the dynamic receiver, at high SNR, $$Y_1 \approx H_1 X_2 [X_1^1 X_1^2], \quad (55)$$

The decoding procedure is similar to the previous method and thus is omitted here.

For the static receiver, the signal at high SNR is $$Y_2 \approx H_2 X_2 [X_1^1 X_1^2], \quad (56)$$

The static receiver knows $X_1^1$, so it can remove the effect of $X_1^1$ from the static signal received at the first $N_1$ time-slot, denoted by $Y_2^1$. For example, one way to achieve this is as follows:

$$Y_2^1 \cdot (X_1^1)^{-1} \approx \sqrt{\frac{T}{N_1}} H_2 X_2 \in C^{N_2 \times N_1}. \quad (57)$$

Because $H_2$ is known by the static receiver, Eq. (57) represents an ordinary point-to-point MIMO channel, and therefore $N_2 N_1$ degrees of freedom can be communicated via $X_2$ to the static receiver (over T time-slots).

Altogether, the Grassmannian-Euclidean superposition attains the degrees of freedom pair $\square_4$ $$D_4 = (N_1(1 - N_1/T), N_2 N_1 T), \quad (58)$$

2) $N_1 > N_2$: Here, the signaling structure given by Eq. (53) cannot be not directly applied. Therefore only $N_2$ antennas at the transmitter may be activated and use only $N_2$ dimensions for the dynamic receiver. The corresponding signaling is $$X = \sqrt{\frac{T}{N_2^2}} X_2 \cdot X_1 \in C^{N_2 \times T}, \quad (59)$$

where $X_1 \in C^{N_2 \times T}$ and $X_2 \in C^{N_2 \times N_2}$, and $$\sqrt{\frac{T}{N_2^2}}$$

is a power normalizing factor.

Following the same argument as the case of $N_1 \leq N_2$, the training-based superposition achieves a degrees of freedom pair $$\mathcal{D}_4 = \left(N_2\left(1 - \frac{N_2}{T}\right), \frac{N_2^2}{T}\right), \quad (60)$$

It should be noted that while elsewhere in this document superposition for two users is described, the illustrative embodiments can easily be generalized to any two data streams, whether they belong to two distinct users or not. As an example, each user may have multiple data streams, some of them related to control data and some of them related to text, audio, images, video, or other data formats. The illustrative embodiments regarding superposition described herein can apply to any two data streams, whether they go to the same user equipment or to different user equipment. In this sense, one may think of each data stream as representing a virtual user, and two or more virtual users may reside on the same physical user equipment. The product superposition may be applied to any two virtual users.

Figure 6:
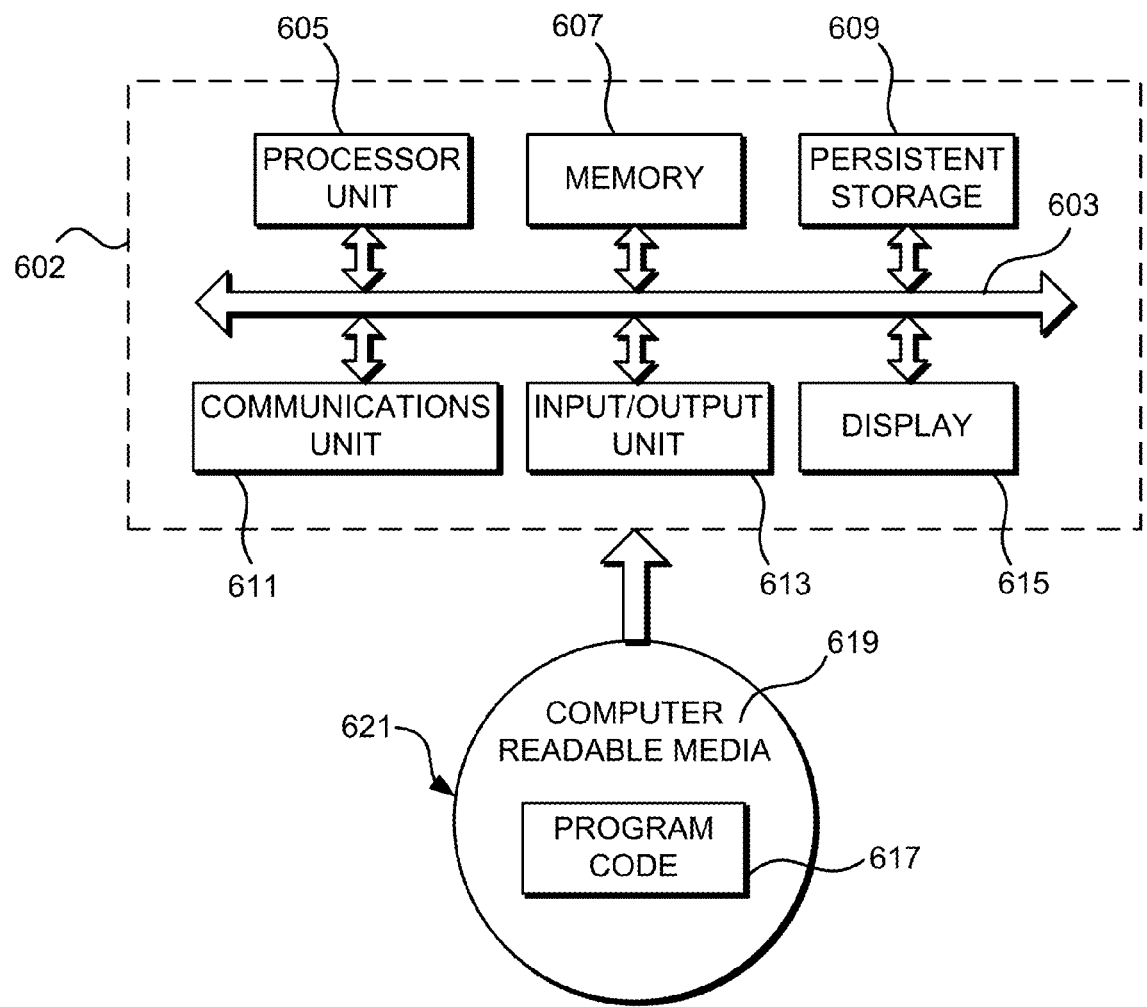
FIG. 6 is a schematic, block diagram of an example data processing system with which aspects of the illustrative embodiments may be implemented.

Referring to FIG. 6, a block diagram of a computing device 602 is shown with which aspects of the illustrative embodiments may be implemented. The computing device 602 may be an example of any of the transmitting or receiving computing devices in FIGS. 2-5, or any computing device for implementing a multiplicative superposition system, including but not limited to FIGS. 7-9. Computer-usable program code or instructions implementing the processes used in the illustrative embodiments may be located on the computing device 602. The computing device 602 includes a communications fabric 603, which provides communications between a processor unit 605, a memory 607, a persistent storage 609, a communications unit 611, an input/output (I/O) unit 613, and a display 615.

The processor unit 605 serves to execute instructions for software that may be loaded into the memory 607. The processor unit 605 may be a set of one or more processors or may be a multi-processor core, depending on the particular implementation. Further, the processor unit 605 may be implemented using one or more heterogeneous processor systems in which a main processor is present with secondary processors on a single chip. As another illustrative example, the processor unit 605 may be a symmetric multi-processor system containing multiple processors of the same type.

The memory 607, in these examples, may be, for example, a random access memory or any other suitable volatile or non-volatile storage device. The persistent storage 609 may take various forms depending on the particular implementation. For example, the persistent storage 609 may contain one or more components or devices. For example, the persistent storage 609 may be a hard drive, a flash memory, a rewritable optical disk, a rewritable magnetic tape, or some combination of the above. The media used by the persistent storage 609 also may be removable. For example, a removable hard drive may be used for the persistent storage 609.

The communications unit 611, in these examples, provides for communications with other data processing systems or communication devices. In these examples, the communications unit 611 may be a network interface card. The communications unit 611 may provide communications through the use of either or both physical and wireless communication links.

The input/output unit 613 allows for the input and output of data with other devices that may be connected to the computing device 602. For example, the input/output unit 613 may provide a connection for user input through a keyboard and mouse. Further, the input/output unit 613 may send output to a processing device. The display 615 provides a mechanism to display information to a user, such as a graphical user interface.

Instructions for the operating system and applications or programs are located on the persistent storage 609. These instructions may be loaded into the memory 607 for execution by the processor unit 605. The processes of the different embodiments may be performed by the processor unit 605 using computer-implemented instructions, which may be located in a memory, such as the memory 607. These instructions are referred to as program code, computer-usable program code, or computer-readable program code that may be read and executed by a processor in the processor unit 605. The program code in the different embodiments may be embodied on different physical or tangible computer-readable media, such as the memory 607 or the persistent storage 609.

Program code 617 is located in a functional form on a computer-readable media, or computer-readable storage media, 619 and may be loaded onto or transferred to the computing device 602 for execution by the processor unit 605. The program code 617 and the computer-readable media 619 form computer program product 621 in these examples.

In one example, the computer-readable media 619 may be in a tangible form, such as, for example, an optical or magnetic disc that is inserted or placed into a drive or other device that is part of the persistent storage 609 for transfer onto a storage device, such as a hard drive that is part of the persistent storage 609. In a tangible form, the computer-readable media 619 also may take the form of a persistent storage, such as a hard drive or a flash memory that is connected to the computing device 602. The tangible form of the computer-readable media 619 is also referred to as computer recordable storage media.

Alternatively, the program code 617 may be transferred to the computing device 602 from the computer-readable media 619 through a communication link to the communications unit 611 or through a connection to the input/output unit 613. The communication link or the connection may be physical or wireless in the illustrative examples. The computer-readable media 619 also may take the form of non-tangible media, such as communication links or wireless transmissions containing the program code 617. In one embodiment, the program code 617 is delivered to the computing device 602 over the Internet.

The different components illustrated for the computing device 602 are not meant to provide architectural limitations to the manner in which different embodiments may be implemented. The different illustrative embodiments may be implemented in a data processing system including components in addition to or in place of those illustrated for computing device 602. Other components shown in FIG. 6 can be varied from the illustrative examples shown.

As one example, a storage device in the computing device 602 is any hardware apparatus that may store data. The memory 607, the persistent storage 609, and the computer-readable media 619 are examples of storage devices in a tangible form.

In another example, a bus system may be used to implement the communications fabric 603 and may be comprised of one or more buses, such as a system bus or an input/output bus. Of course, the bus system may be implemented using any suitable type of architecture that provides for a transfer of data between different components or devices attached to the bus system. Additionally, the communications unit 611 may include one or more devices used to transmit and receive data, such as a modem or a network adapter. Further, a memory may be, for example, the memory 607 or a cache such as found in an interface and memory controller hub that may be present in the communications fabric 603.

Figure 7:
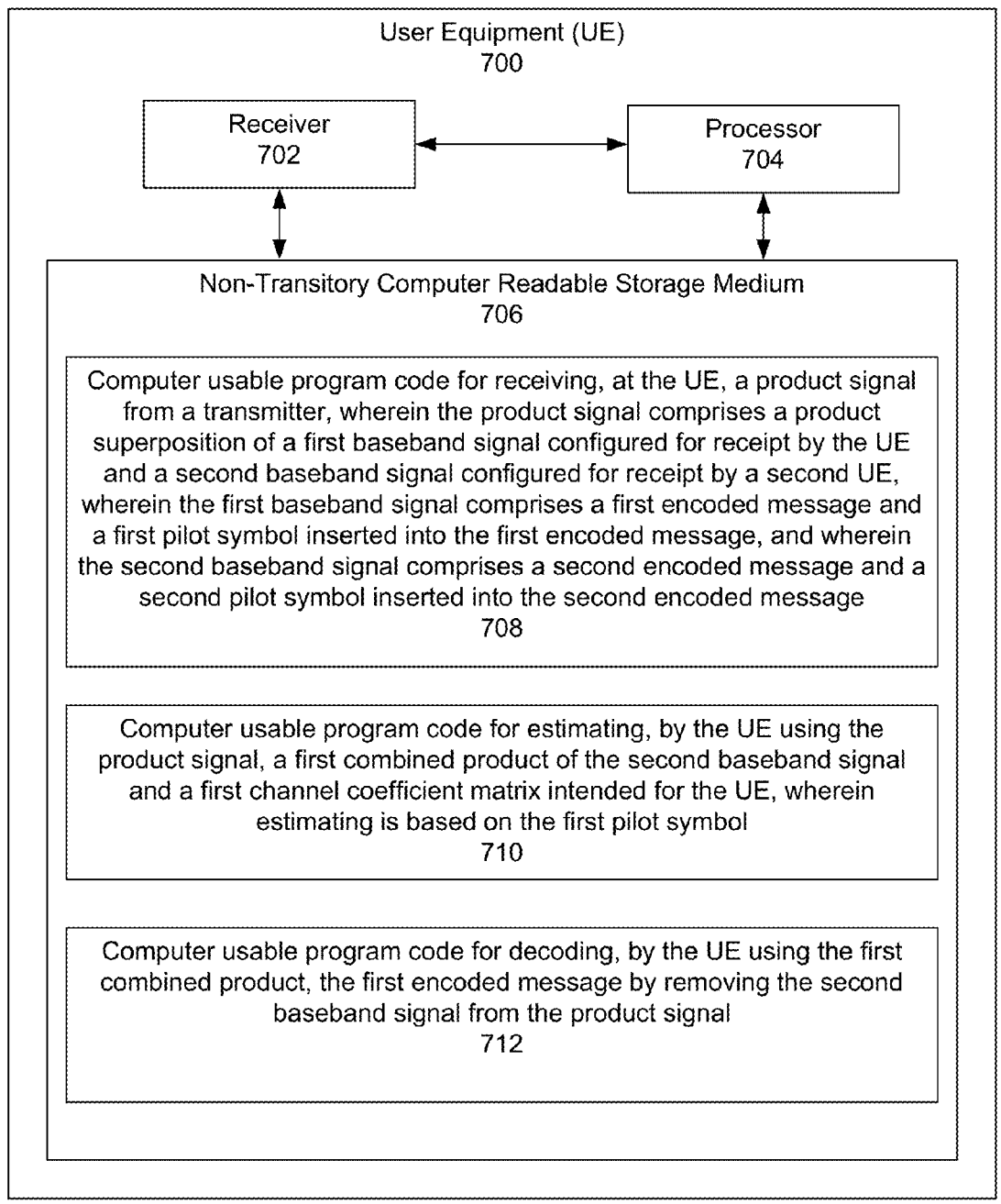
FIG. 7 is a block diagram of a user equipment (UE) according to an illustrative embodiment.

FIG. 7 is a block diagram of a user equipment (UE) according to an illustrative embodiment. UE 700 may be any device as described with respect to FIGS. 1-6. Processor 704 may be processor unit 605 of FIG. 6. The superposition process described with respect to UE 700 may be any of the superposition processes described above with respect to FIGS. 1-5. UE 700 is particularly described and fully supported with respect to FIG. 4 and FIG. 5.

UE 700 may include receiver 702 configured to receive signals. UE 700 may also include processor 704 in communication with receiver 702. UE 700 may also include non-transitory computer readable storage medium 706. Non-transitory computer readable storage medium 706 may be in communication with processor 704. Non-transitory computer readable storage medium 706 may store program code which, when executed by processor 704 performs a method.

The computer usable program code may include computer usable program code for receiving, at the UE, a product signal from a transmitter, wherein the product signal comprises a product superposition of a first baseband signal configured for receipt by the UE and a second baseband signal configured for receipt by a second UE, wherein the first baseband signal comprises a first encoded message and a first pilot symbol inserted into the first encoded message, and wherein the second baseband signal comprises a second encoded message and a second pilot symbol inserted into the second encoded message (708).

The computer usable program code may include computer usable program code for estimating, by the UE using the product signal, a first combined product of the second baseband signal and a first channel coefficient matrix intended for the UE, wherein estimating is based on the first pilot symbol (710). The computer usable program code may also include computer usable program code for decoding, by the UE using the first combined product, the first encoded message by removing the second baseband signal from the product signal (712).

These illustrative embodiments may be varied. For example, UE 700 and the second UE may be two virtual devices residing in the UE. In another variation, UE 700 may be configured to receive the first pilot symbol in a first designated time and frequency slot, denoted as a training slot, and wherein the UE is configured to perform decoding in another time and frequency slot, denoted as a data slot, and wherein the UE is configured to perform receiving over both the training slot and the data slot.

In still another illustrative embodiment, a plurality of additional UEs may be present in a communication system that includes UE 700. In this case, times and frequencies of operations of the UE and the plurality of additional UEs may be divided into a plurality of intervals via time division multiple access, frequency division multiple access, or both. Accordingly, in some of the plurality of intervals, UE 700 may operate together with at least one of the plurality of additional UEs when performing the receiving, estimating, and decoding operations described above.

Still other variations are possible. For example, UE 700 and the second UE may be distinct. UE 700 may be unaware of the second UE. As many variations are possible, the variations described above are not exhaustive and are not necessarily limiting of the claimed inventions.

Figure 8:
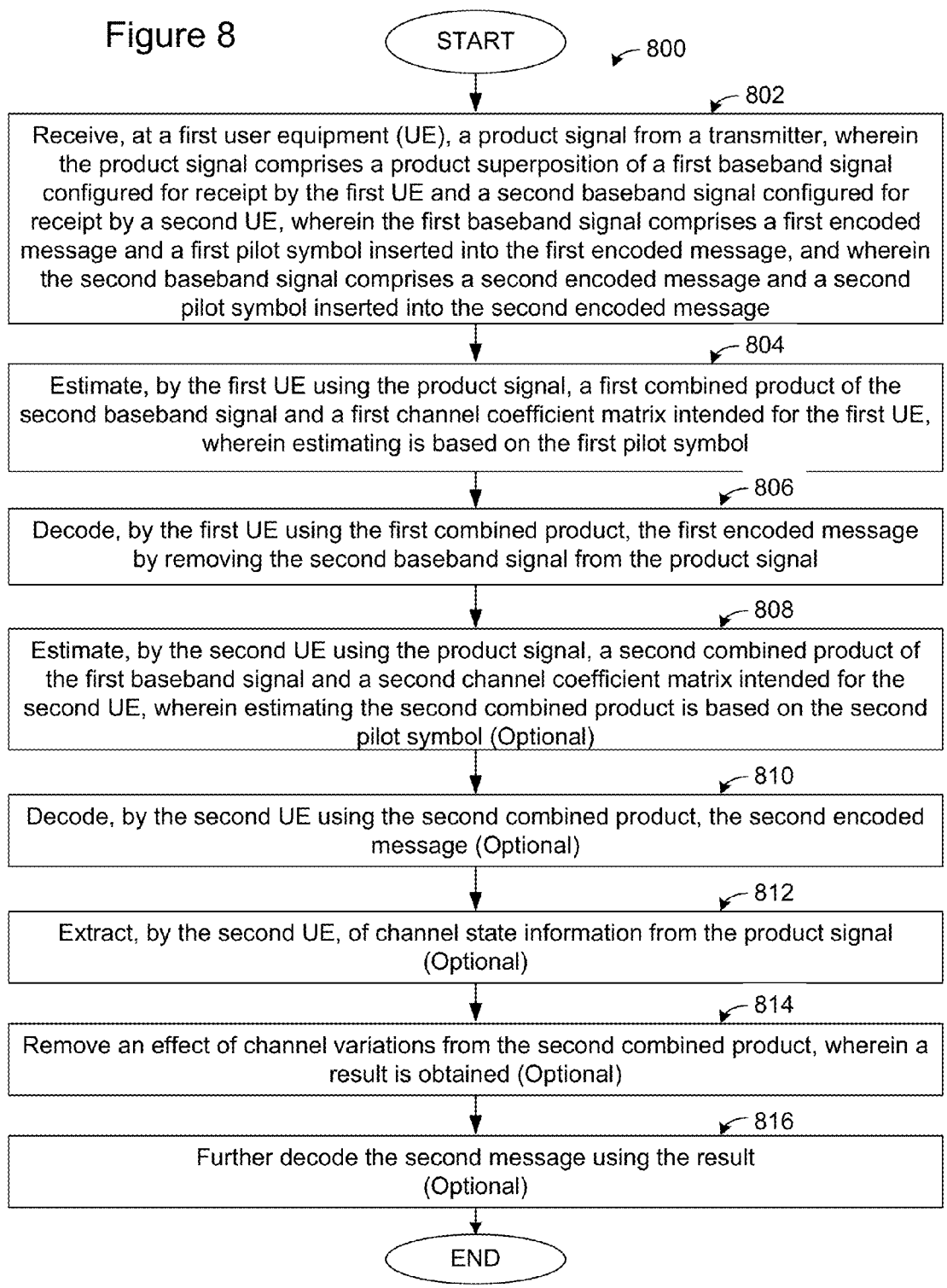
FIG. 8 is a flowchart of a method of using superposition in a user equipment (UE) according to an illustrative embodiment.

FIG. 8 is a flowchart of a method of using superposition in a user equipment (UE) according to an illustrative embodiment. Method 800 may be a method of performing superposition in a UE, such as UE 700 of FIG. 7. Method 800 may be implemented in any other device described herein. Method 800 is fully supported and described elsewhere herein, particularly with respect to FIG. 4 and FIG. 5.

Method 800 may begin by receiving, at a first user equipment (UE), a product signal from a transmitter, wherein the product signal comprises a product superposition of a first baseband signal configured for receipt by the first UE and a second baseband signal configured for receipt by a second UE, wherein the first baseband signal comprises a first encoded message and a first pilot symbol inserted into the first encoded message, and wherein the second baseband signal comprises a second encoded message and a second pilot symbol inserted into the second encoded message (operation 802). Subsequently, the processor of the UE may Estimate, by the first UE using the product signal, a first combined product of the second baseband signal and a first channel coefficient matrix intended for the first UE, wherein estimating is based on the first pilot symbol (operation 804). The processor of the UE may then decode, by the first UE using the first combined product, the first encoded message by removing the second baseband signal from the product signal (operation 806). Optionally, the process may terminate thereafter.

However, these illustrative embodiments may be varied or extended. For example, optionally, the processor, or a second processor on a different UE may then estimate by the second UE using the product signal, a second combined product of the first baseband signal and a second channel coefficient matrix intended for the second UE, wherein estimating the second combined product is based on the second pilot symbol (operation 808). Also optionally, the second UE may decode, using the second combined product, the second encoded message (operation 810).

Also optionally, the second UE may extract channel state information from the product signal (operation 812). Also optionally, the second UE may remove an effect of channel variations from the second combined product, wherein a result is obtained (operation 814). Also optionally, the second UE may further decode the second message using the result (operation 816).

The illustrative embodiments described with respect to FIG. 8 may be varied. For example, while the illustrative embodiments described in FIG. 8 refer to first and second UEs, possibly a single physical UE may implement all of the operations referenced in FIG. 8. As described above, the illustrative embodiments can easily be generalized to any two data streams, whether they belong to two distinct users or not. As an example, each user may have multiple data streams, some of them related to control data and some of them related to text, audio, images, video, or other data formats. The illustrative embodiments regarding superposition described herein can apply to any two data streams, whether they go to the same user equipment or to different user equipment. In this sense, one may think of each data stream as representing a virtual user, and two or more virtual users may reside on the same physical user equipment. The product superposition may be applied to any two virtual users.

However, the "second" UE may also be a distinct physical UE different than the first UE. Accordingly, the illustrative embodiments described above are not necessarily limiting of the claimed inventions.

Figure 9:
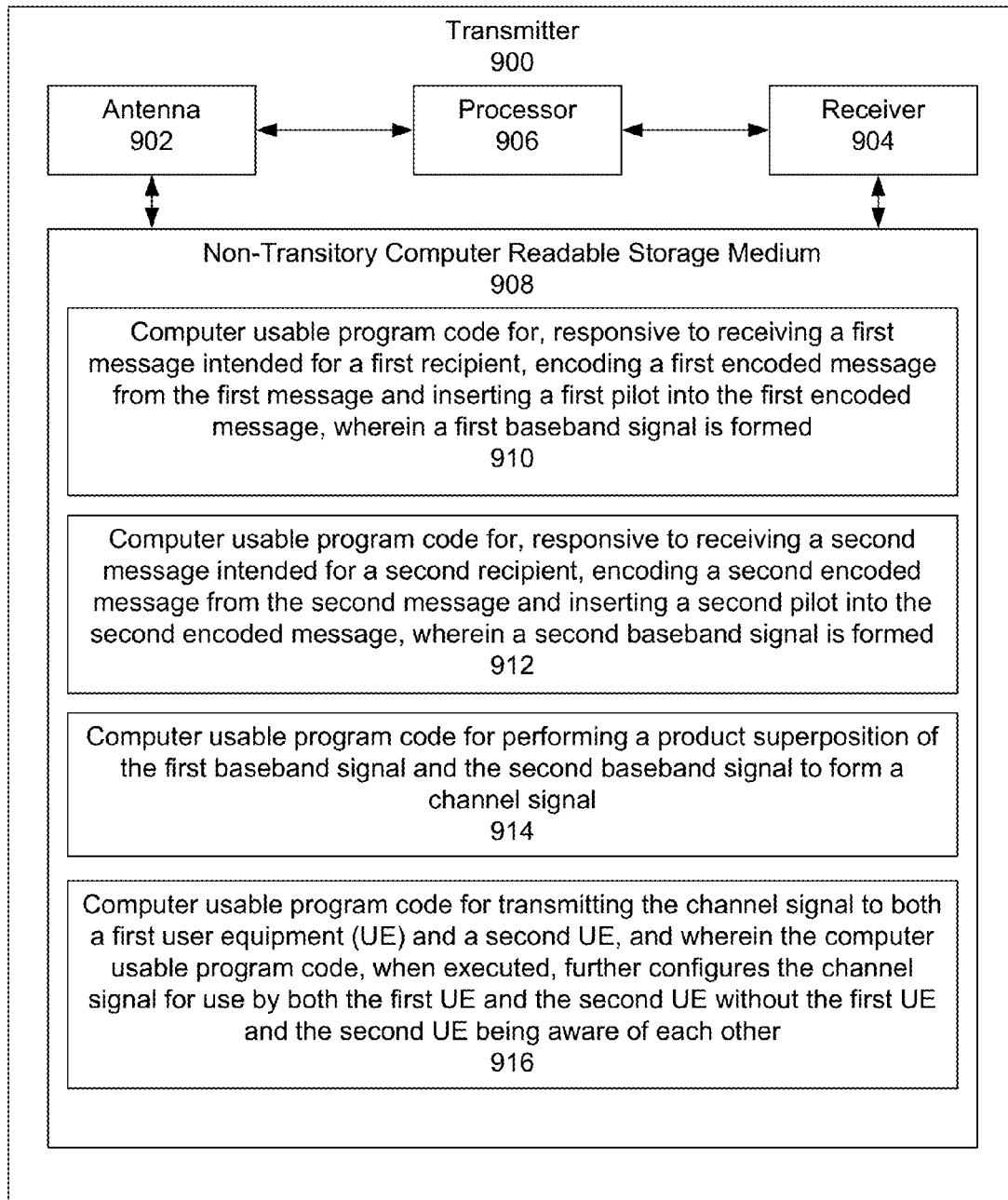
FIG. 9 is a block diagram of a transmitter according to an illustrative embodiment.

FIG. 9 is a block diagram of a transmitter according to an illustrative embodiment. The illustrative embodiments described with respect to FIG. 9 are described and supported with respect to FIG. 4 and FIG. 5. Processor 906 may be processor unit 605 of FIG. 6.

Transmitter 900 may include antenna 902. Antenna 902 may be configured to transmit a transmitted signal.

Transmitter 900 may also include receiver 904. Receiver 904 may be configured to receive a received signal.

Transmitter 900 may also include processor 906. Processor 906 may be in communication with antenna 902 and receiver 904. Transmitter may include non-transitory computer readable storage medium 908 in communication with processor 906. Non-transitory computer readable storage medium 908 may store computer usable program code executable by processor 906.

The computer usable program code may include computer usable program code for, responsive to receiving a first message intended for a first recipient, encoding a first encoded message from the first message and inserting a first pilot into the first encoded message, wherein a first baseband signal is formed (code 910). The computer usable program code may also include computer usable program code for, responsive to receiving a second message intended for a second recipient, encoding a second encoded message from the second message and inserting a second pilot into the second encoded message, wherein a second baseband signal is formed (code 912).

The computer usable program code may also include computer usable program code for performing a product superposition of the first baseband signal and the second baseband signal to form a channel signal (code 914). The computer usable program code may also include computer usable program code for transmitting the channel signal to both a first user equipment (UE) and a second UE, and wherein the computer usable program code, when executed, further configures the channel signal for use by both the first UE and the second UE without the first UE and the second UE being aware of each other (code 916).

The illustrative embodiments described with respect to FIG. 9 may be varied. For example, transmitter 900 may be programmed to treat one of the first UE and the second UE as a virtual UE and to treat the other of first UE and the second UE as a real UE. In another example, transmitter 900 may be programmed to transmit the channel signal in a plurality of time slots and frequency slots.

The illustrative embodiments may be further varied. Therefore, the illustrative embodiments described herein do not necessarily limit the claimed inventions.

Further, although the illustrative embodiments described herein have been disclosed in the context of certain illustrative, non-limiting embodiments, it should be understood that various changes, substitutions, permutations, and alterations can be made without departing from the scope of the invention. It will be appreciated that any feature that is described in connection to any one embodiment may also be applicable to any other embodiment.

Insofar as the description above and the accompanying drawings disclose any additional subject matter that is not within the scope of the single claim below, the illustrative embodiments are not dedicated to the public and the right to file one or more applications to claim such additional embodiments is reserved.

Although a very narrow claim may be presented herein, it should be recognized that the scope of the illustrative embodiments is much broader than presented by the claim. It is intended that broader claims will be submitted in an application that claims the benefit of priority from this application.

What is claimed is:

1. A method comprising:
receiving, at a first user equipment (UE), a product signal from a transmitter, wherein the product signal comprises a product superposition of a first baseband signal configured for receipt by the first UE and a second baseband signal configured for receipt by a second UE, wherein the first baseband signal comprises a first encoded message and a first pilot symbol inserted into the first encoded message, and wherein the second baseband signal comprises a second encoded message and a second pilot symbol inserted into the second encoded message;
estimating, by the first UE using the product signal, a first combined product of the second baseband signal and a first channel coefficient matrix intended for the first UE, wherein estimating is based on the first pilot symbol; and
decoding, by the first UE using the first combined product, the first encoded message by removing the second baseband signal from the product signal.

2. The method of claim 1 further comprising:
estimating, by the second UE using the product signal, a second combined product of the first baseband signal and a second channel coefficient matrix intended for the second UE, wherein estimating the second combined product is based on the second pilot symbol; and
decoding, by the second UE using the second combined product, the second encoded message.

3. The method of claim 2, wherein the first UE and the second UE are distinct.

4. The method of claim 3, wherein the first UE and the second UE are unknown to each other.

5. The method of claim 1, wherein the first UE and the second UE comprise two virtual devices residing in the same physical device.

6. The method of claim 1, wherein the first UE receives the first pilot symbol in a first designated time and frequency slot, denoted as a training slot, and wherein the first UE performs decoding in another time and frequency slot, denoted as a data slot, and wherein the first UE performs receiving over both the training slot and the data slot.

7. The method of claim 2, wherein the degrees of freedom achieved by receiving, estimating, and decoding by the first UE and the second UE comprises a maximum degrees of freedom available for any transmission strategy or reception strategy under a same number of antennas and coherence time as the first UE and second UE.

8. The method of claim 2 further comprising:
extracting, by the second UE, of channel state information from the product signal;
removing an effect of channel variations from the second combined product, wherein a result is obtained; and
further decoding the second message using the result.

9. The method of claim 1, wherein a plurality of additional UEs are present in a communication system, wherein times and frequencies of operations of the first UE and the plurality of additional UEs are divided into a plurality of intervals via time division multiple access, frequency division multiple access, or both, and wherein the method further comprises:
in some of the plurality of intervals, at least one of the plurality of additional UEs operates together with the first UE when performing receiving, estimating, and decoding.

10. The method of claim 9, wherein pairs of UEs among the first UE and the plurality of additional UEs operate together when performing receiving, estimating, and decoding, and wherein ones of intervals in the plurality of intervals accommodate ones of corresponding pairs of UEs.

11. The method of claim 10, wherein at least one pair of UEs comprises a single UE using two different channels, with the single UE performing receiving, estimating, and decoding on the two different channels.

12. A user equipment (UE) comprising:
- a receiver configured to receive signals;
- a processor in communication with the receiver; and
- a non-transitory computer readable storage medium in communication with the processor, the non-transitory computer readable storage medium storing program code which, when executed by the processor performs a method, the computer usable program code comprising:
- computer usable program code for receiving, at the UE, a product signal from a transmitter, wherein the product signal comprises a product superposition of a first baseband signal configured for receipt by the UE and a second baseband signal configured for receipt by a second UE, wherein the first baseband signal comprises a first encoded message and a first pilot symbol inserted into the first encoded message, and wherein the second baseband signal comprises a second encoded message and a second pilot symbol inserted into the second encoded message;
- computer usable program code for estimating, by the UE using the product signal, a first combined product of the second baseband signal and a first channel coefficient matrix intended for the UE, wherein estimating is based on the first pilot symbol; and
- computer usable program code for decoding, by the UE using the first combined product, the first encoded message by removing the second baseband signal from the product signal.

13. The UE of claim 12, wherein the UE and the second UE comprise two virtual devices residing in the UE.

14. The UE of claim 12, wherein the UE is configured to receive the first pilot symbol in a first designated time and frequency slot, denoted as a training slot, and wherein the UE is configured to perform decoding in another time and frequency slot, denoted as a data slot, and wherein the UE is configured to perform receiving over both the training slot and the data slot.

15. The UE of claim 12, wherein a plurality of additional UEs are present in a communication system, wherein times and frequencies of operations of the UE and the plurality of additional UEs are divided into a plurality of intervals via time division multiple access, frequency division multiple access, or both, and wherein the method further comprises:
- in some of the plurality of intervals, the UE operates together with at least one of the plurality of additional UEs when performing receiving, estimating, and decoding.

16. The UE of claim 12, wherein the UE and the second UE are distinct.

17. The UE of claim 16, wherein the UE is unaware of the second UE.

18. A transmitter comprising:
- an antenna configured to transmit a transmitted signal;
- a receiver configured to receive a received signal;
- a processor in communication with the antenna and the receiver; and
- a non-transitory computer readable storage medium in communication with the processor and storing computer usable program code executable by the processor, the computer usable program code comprising:
- computer usable program code for, responsive to receiving a first message intended for a first recipient, encoding a first encoded message from the first message and inserting a first pilot into the first encoded message, wherein a first baseband signal is formed;
- computer usable program code for, responsive to receiving a second message intended for a second recipient, encoding a second encoded message from the second message and inserting a second pilot into the second encoded message, wherein a second baseband signal is formed;
- computer usable program code for performing a product superposition of the first baseband signal and the second baseband signal to form a channel signal; and
- computer usable program code for transmitting the channel signal to both a first user equipment (UE) and a second UE, and wherein the computer usable program code, when executed, further configures the channel signal for use by both the first UE and the second UE without the first UE and the second UE being aware of each other.

19. The transmitter of claim 18, wherein the transmitter is programmed to treat one of the first UE and the second UE as a virtual UE and to treat the other of first UE and the second UE as a real UE.

20. The transmitter of claim 18, wherein the transmitter is programmed to transmit the channel signal in a plurality of time slots and frequency slots.

* * * * *